United States Patent [19]

Dotson et al.

[11] Patent Number: 5,269,834
[45] Date of Patent: Dec. 14, 1993

[54] PROCESS FOR REMOVAL OF INERT GASES FROM LIQUID CHLORINE AND SYSTEM THEREFOR

[75] Inventors: Ronald L. Dotson; Harry J. Loftis, both of Cleveland, Tenn.; Robert K. Steely, Louisville, Ky.

[73] Assignee: Olin Corporation, Cheshire, Conn.

[21] Appl. No.: 960,075

[22] Filed: Oct. 13, 1992

[51] Int. Cl.$^5$ .................. B01D 19/00; B01D 53/04
[52] U.S. Cl. ............................ 95/104; 95/106; 95/116; 95/255; 95/110; 95/144; 95/157; 55/274; 210/662; 210/673; 423/501; 423/503
[58] Field of Search ................ 55/36, 47, 58, 75, 189, 55/208, 274, 389; 210/662, 673, 681, 275, 283; 423/500, 501, 503

[56] References Cited

U.S. PATENT DOCUMENTS

| | | | |
|---|---|---|---|
| 3,168,376 | 2/1965 | Neely | 423/500 |
| 3,285,701 | 11/1966 | Robertson . | |
| 3,534,562 | 10/1970 | Thijssen | 423/500 X |
| 3,941,573 | 3/1976 | Chapel | 55/389 X |
| 3,959,450 | 5/1976 | Calloue et al. | 423/500 X |
| 3,960,768 | 6/1976 | Ripperger et al. | 55/67 X |
| 4,012,206 | 3/1977 | Macriss et al. | 55/34 |
| 4,046,709 | 9/1977 | Yuki | 423/445 X |
| 4,248,608 | 2/1981 | Giammarco et al. | 55/43 |
| 4,256,773 | 3/1981 | Itoga et al. | 426/415 |
| 4,261,709 | 4/1981 | Itoga et al. | 55/71 |
| 4,353,716 | 10/1982 | Rohde | 55/59 |
| 4,420,415 | 12/1983 | Yuki et al. | 502/180 |
| 4,496,376 | 1/1985 | Hradek | 55/163 |
| 4,526,887 | 7/1985 | Sutt, Jr. | 502/420 |
| 4,528,281 | 7/1985 | Sutt, Jr. | 502/402 |
| 4,594,163 | 6/1986 | Sutt, Jr. | 210/660 |
| 4,661,124 | 4/1987 | Hamlin et al. | 55/21 |
| 4,762,537 | 8/1988 | Fleming et al. | 55/71 |
| 4,770,678 | 9/1988 | Haslett, Jr. | 55/389 X |
| 4,786,294 | 11/1988 | Jonqueres et al. | 55/28 |
| 4,810,266 | 3/1989 | Zinnen et al. | 55/68 |
| 4,869,733 | 9/1989 | Stanford | 55/21 |
| 4,875,914 | 10/1989 | Wireman | 55/389 |
| 4,880,443 | 11/1989 | Miller et al. | 55/26 |
| 4,892,567 | 1/1990 | Yan | 55/33 |
| 4,983,190 | 1/1991 | Verrando et al. | 55/21 |
| 5,071,450 | 12/1991 | Cabrera et al. | 55/66 |
| 5,082,569 | 1/1992 | Homeier et al. | 210/679 |

FOREIGN PATENT DOCUMENTS 64-51311  2/1989  Japan ..................... 55/36

*Primary Examiner*—Robert Spitzer
*Attorney, Agent, or Firm*—H. Samuel Kieser; Ralph D'Alessandro

[57] ABSTRACT

A method and system for treating liquid chlorine to remove inert gases therefrom. Liquid chlorine is treated by passing it through a molecular sieve having a molecular pore diameter greater than the molecular diameter of the inert gases and smaller than the molecular diameter of chlorine so that the inert gases are adsorbed by the sieve while the liquid chlorine passes therethrough. The sieve may be regenerated by heating the sieve and evacuating by vacuum, followed by a purging with a gas and then a further vacuum evacuation.

16 Claims, 3 Drawing Sheets

PROCESS FOR REMOVAL OF INERT GASES FROM LIQUID CHLORINE AND SYSTEM THEREFOR

BACKGROUND OF THE INVENTION

Chlorine is used today in many industrial processes, particularly as a component material in various organic and inorganic reactions. Many chemical manufacturers which use chlorine as one of the ingredients in their chemical processes are attempting to reduce production cost and increase efficiency of the processes. As a result, they are demanding that the liquid chlorine they use have a relatively low level of inert non-condensible gases such as hydrogen, nitrogen, oxygen, carbon dioxide and carbon monoxide. In general, they desire less than 200 parts per million (ppm) of an inert gas. This is because the presence of such inert gases such as carbon dioxide ($CO_2$) and carbon monoxide (CO) in the chlorine have an adverse effect upon some processes. For example, some inert gases such as $CO_2$ will destroy catalysts and produce undesirable byproducts in polymerization processes. Additionally, these gases as well as oxygen, will adversely effect the catalysts used in the production of phosphorous trichloride and pentachloride and other metal halides.

SUMMARY OF THE INVENTION

In view of the above, it is an object of the present invention to provide a process and system for the removal of inert gases from liquid chlorine.

More specifically, it is an object of the present invention to provide a process and system in which chlorine may be purified by the removal of inert non-condensible gases and which process can be regenerated after a period of time to continue in use.

These and other objects of the invention may be accomplished the present invention through a processes for the removal of inert, gases from liquid chlorine in which a molecular sieve is provided which has a molecular pore diameter greater than the molecular diameter of the inert gases to be removed and smaller than the molecular diameter of chlorine. Liquid chlorine is passed through the sieve whereby at least some of the inert gas is adsorbed by the molecular sieve while the liquid chlorine passes therethrough.

According to a further aspect of the invention, the molecular sieve may be periodically regenerated by heating the molecular sieve and vacuum evacuating the container in which the sieve is contained. In accordance with another aspect of the invention, the molecular sieve may be regenerated by passing gaseous chlorine at an elevated temperature through the molecular sieve after the vacuum evacuation.

A system for practicing the present invention may include a column in which is positioned a molecular sieve, the molecular sieve having a molecular pore diameter greater than the molecular diameter of the inert gases to be removed, and smaller than the molecular diameter of the chlorine. A source of liquid chlorine under pressure is provided. Means are provided for connecting said source of chlorine to said column to permit said chlorine to flow to the column and pass through the molecular sieve to remove at least a portion of the inert gases.

BRIEF DESCRIPTION OF THE DRAWINGS

A better understanding of this invention may be had by reference to the following drawings and to the accompanying description in which.

DETAILED DESCRIPTION

Figure 1:
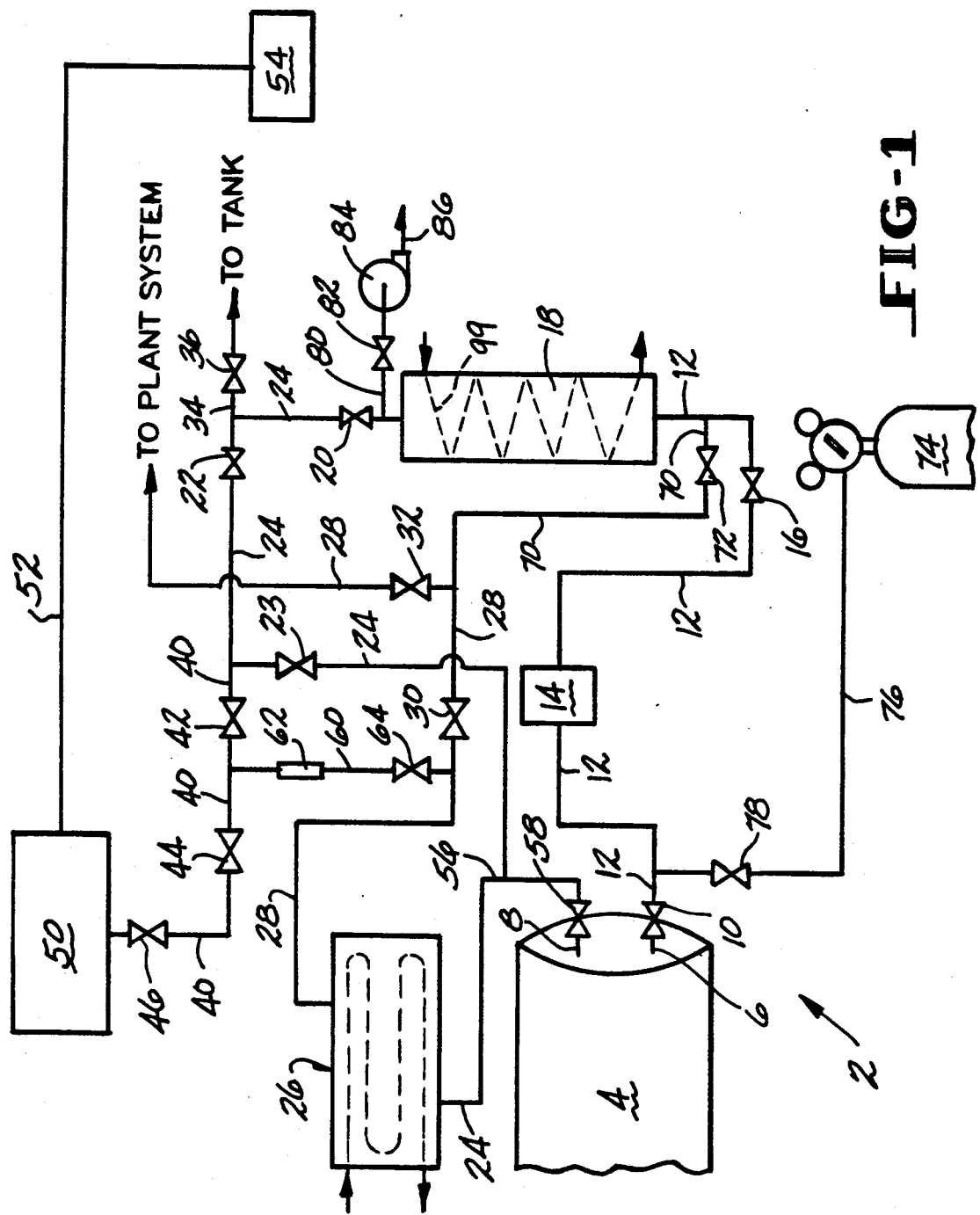
FIG. 1 is a schematic representation of a system capable of practicing the present invention.

Referring to the Drawings, and in particular FIG. 1, there is shown a chlorine purification system 2 constructed in accordance with the present invention. The system includes a cylindrical storage tank 4 which stores liquid chlorine under pressure. This pressure depends upon ambient temperature and may, for example, be 70 psig at 80° F., 101.76 psig at 80° F. and 140.20 psig at 100° F. The storage tank 4 is provided with a lower outlet 6 and an upper outlet 8. The lower outlet 6 is positioned so that liquid chlorine flows from the storage tank 4, while the upper outlet 8 is positioned so that chlorine gas, which is present in the tank above the liquid chlorine, can be withdrawn from the tank 4. The outlet 6 has a shut-off valve 10 associated therewith and is connected by line 12 through a suitable flow meter 14 such as a Micro-Motion meter and a flow-control valve 16 into the bottom of a molecular sieve column 18.

The top of the molecular sieve column 18 is connected through valves 20, 22 and 23 by line 24 to a heat exchanger 26. The outlet of the heat exchanger 26 is connected by a line 28 through a series of valves 30 and 32 to an on-site plant system which may include a scrubber (not shown) and a plant processing system whereby the chlorine may be utilized on-site as desired. A T-joint may be provided in line 24 between valves 20 and 22 as shown so that a line 34 may be provided to provide a connection to a receptacle (not shown) such as a tank car or tanker truck for transporting the purified liquid chlorine to another location. A shut off valve 36 is provided in line 34.

A sampling line 40, containing three valves 42, 44 and 46 as shown, has one end connected to line 24 between valves 22 and 23 as shown and the other end to a vaporizer 50. For sampling purposes, a line 52 extends from the vaporizer 50 to a gas chromograph 54.

For regeneration of the molecular sieve material in column 18, it may be desirable to pass heated chlorine gas through the column 18 as described below. A line 56 extends from a shut-off valve 58 associated with outlet 8 on the storage tank 4 to line 24 at a point between valve 23 and the heat exchanger 26.

Also, a line 60 extends from line 28 at a point upstream of valve 30 to line the 40 at a point between the valves 42 and 44. This line 60 effectively provides a connection between the output side of the heat exchanger 26 and the line 24 extending to the top of the molecular sieve column 18.

To provide for a nitrogen purge of the system 2, a source of nitrogen such as a standard nitrogen tank 79 is provided. A line 70 extends from line 12 at the bottom of the molecular sieve column 18 to line 28 at a point between valves 30 and 32, so that the bottom of the molecular sieve column may be connected through lines 70 and 28 to the exit to the scrubber and plant system.. A valve 72 is positioned in line 70 adjacent its connection to line 12 as shown.

A Line 76 extends from the outlet of the nitrogen tank 79 to the line 12 coming from the outlet port 6 of the cylindrical storage tank and running to the bottom of the molecular sieve column 18. The line 76 joins line 12 between valve 10 and the flow meter 14. A shut-off valve 78 is provided in line 76 as shown.

A line 80 extends from line 24 at a point adjacent the top of the molecular sieve column 18 through a valve 82 to a vacuum pump 84. The vacuum pump 84 discharges through a line 86 to a suitable scrubber and/or other treatment system. The vacuum pump 84 provides a means whereby the molecular sieve column may be vacuum-evacuated as will be discussed below.

Figure 2:
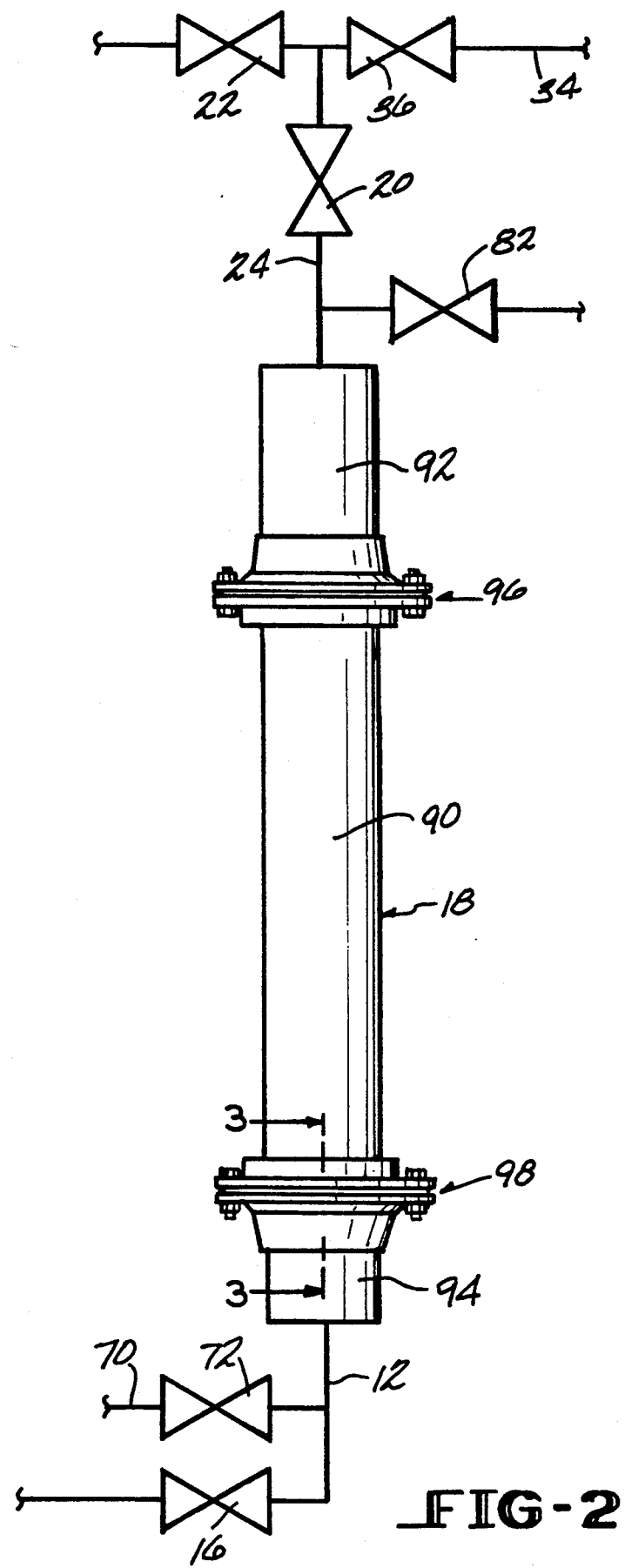
FIG. 2 is an enlarged, partial schematic, elevational view of the molecular sieve column which forms a part of the system of FIG. 1.
Figure 3:
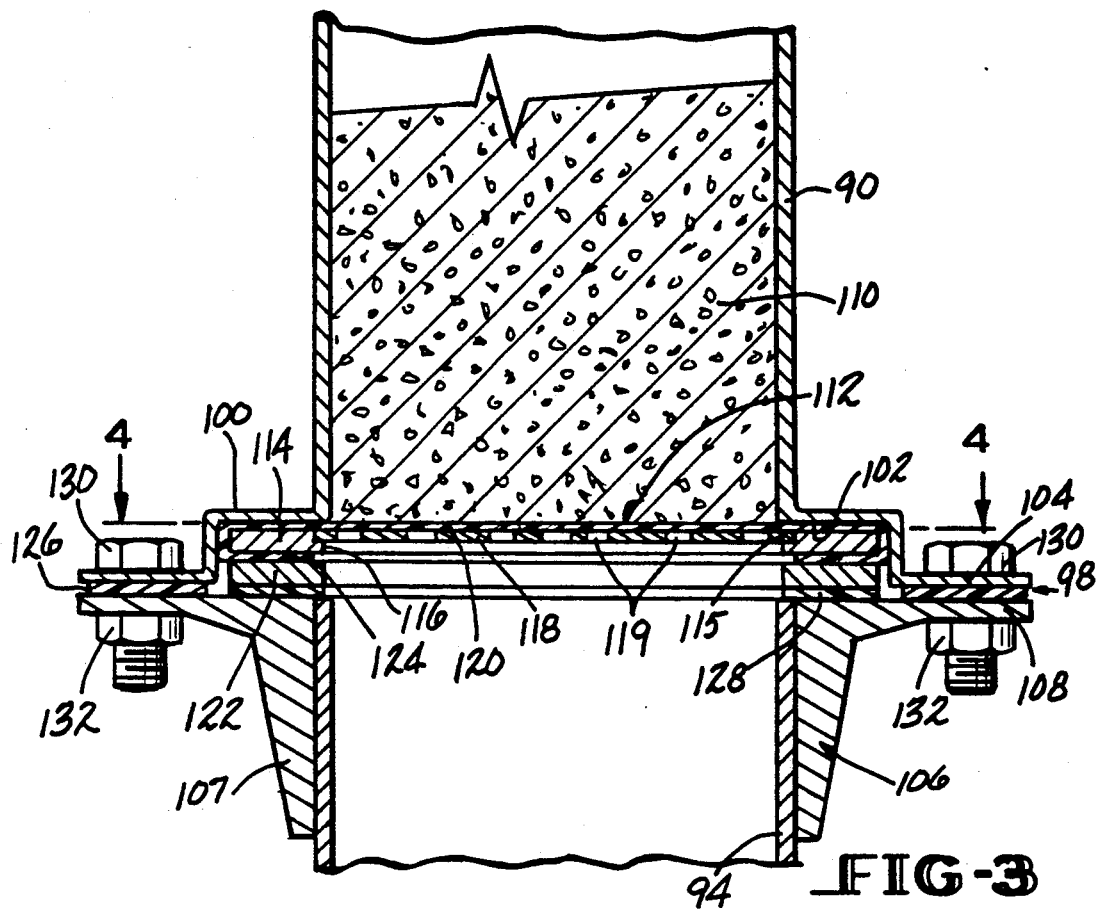
FIG. 3 is a partial vertical sectional view taken along the lines 3—3 of FIG. 2 and showing a coupling used in molecular sieve column.
Figure 4:
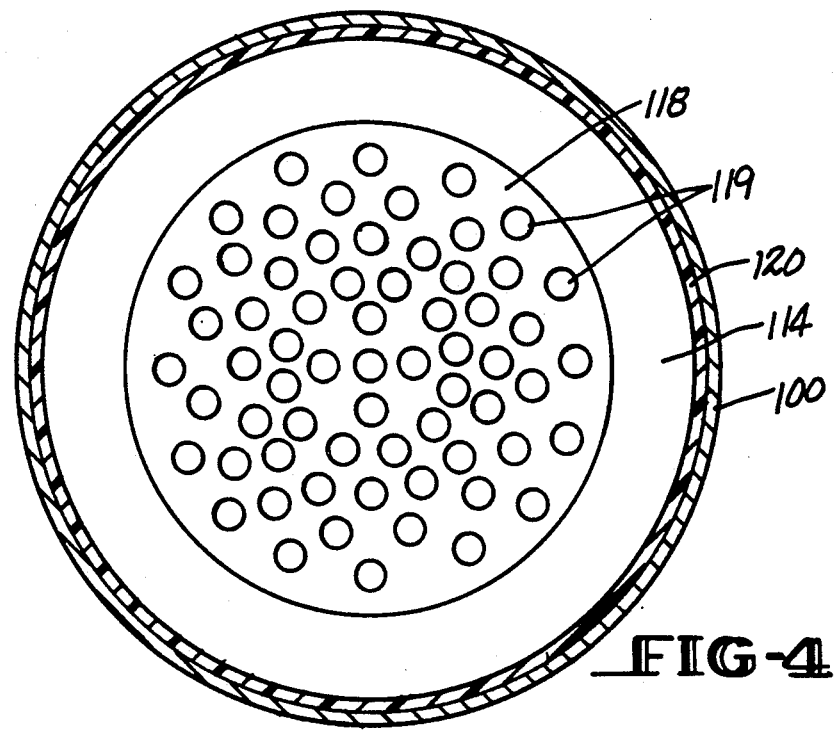
FIG. 4 is a sectional view taken along the lines 4—4 of FIG. 3.

Referring now to FIGS. 2,3 and 4, the molecular sieve column 18 includes an intermediate tubular section 90 and upper and lower tubular sections 92 and 94 respectively. The upper and lower sections 92 and 94 may be joined to the intermediate portion by coupling assemblies 96 and 98 as shown. The molecular sieve column 18 is also preferably provided with a jacketed heat exchanger 99 surrounding the column as shown schematically in FIG. 1. This heat exchanger may be electrical, steam or hot gas.

FIGS. 3 and 4 show the details of the lower coupling assembly 98 connecting the lower tubular portion 94 to the intermediate portion 90. It is to be understood that the upper coupling assembly 96 is similar thereto except that it is inverted.

The coupling assembly 98 includes a flared end portion 100 on the tubular column 90 in the form of a right-angled recess 102 and a radially extending flange 104, both of which extend circularly about the axis of the tubular section 90. A collar 106 is provided about the lower tubular section 94 adjacent its upper end thereof and is firmly attached thereto as by welding or the like. The collar 106 includes a body portion 107 in engagement with the outer wall of the tubular section 94 and a radially extending circular flange 108. The molecular sieve material 110 is positioned within the intermediate tubular column 90 and is held therein by a retaining assembly 112 mounted within the recess 114 of each of the coupling assemblies 96 and 98.

The retaining assembly 112 includes an inner steel washer member 114 having a recess 115 in its inner periphery 106 in which is mounted a foraminous member 118. The member 118 may comprise a steel disk having a plurality of apertures 119 extending therethrough. Alternatively, the washer and foraminous member may be fabricated or one piece.

A retainer member 120 of pliable, chemically stable material extends across the inner face of the disk 118 and washer member 114. The retaining member 120 is wrapped around the side edges of the washer 114 and is folded across the outer surface. The retainer member 120 is of the type which will permit passage of the liquid chlorine therethrough, but prevent the molecular sieve material from clogging the apertures in the steel disk 116. The retainer member 120 may be fabricated from any suitable material such as wire mesh fabricated from monel, nickel or cloth fabricated from a fluoronated organic and which is resistant to chlorine. The preferred material is a cloth made from polytetrafluoroethylene.

A second steel washer member 122 is positioned against the folded over portion 124 of the cloth 120. An outer circular gasket 126 is positioned between the flange 104 on the intermediate tubular section 90 and the flange 108 of the collar 106 attached to the bottom tubular section 94. A second gasket 128 is positioned between a radially inner portion of the flange 108 of the collar 106 and the washer 122 as shown. Alternatively, a single large gasket may be used. Suitable bolts 130 extend through the flanges 104 and 108 with nut members 132 attached to the threaded end thereof to securely tighten the flanges 104 and 108 together compressing the gaskets 124 and 126 and holding the retaining assembly 112 in place.

The gaskets 126 and 128 are fabricated from a material which is resistant to chlorine and also resistant to relatively high temperatures. The preferred material for use as the gaskets 126 and 128 is a non-asbestos gasket material sold under the GYLON trademark of GARLOCK, INC.

The molecular sieve material 110 is positioned within the intermediate tubular section 90 of the molecular sieve column 18 between the retaining assemblies 112 associated with the upper and lower flange coupling assembly 96 and 98. The cloth member contains the molecular sieve material 110 within the intermediate tubular section 90 while permitting the passage of chlorine therethrough.

The molecular sieve material 110 may be any one of the crystalline, metal alumina, silicates belonging to the class of minerals known as zeolites. The particular molecular sieve should have a molecular pore diameter greater than the effective molecular diameter of the inert non-condensible gases to be absorbed, but smaller than the critical molecular diameter of chlorine.

The following Table sets forth the critical molecular diameters for the various inert gases to be removed as well as chlorine.

TABLE 1

|  | Critical Mol. Diameter (nm) |
|---|---|
| Hydrogen | 0.24 |
| Nitrogen | 0.30 |
| Oxygen | 0.28 |
| Carbon Dioxide | 0.28 |
| Carbon Monoxide | 0.38 |
| Chlorine | 0.82 |

As noted from the above Table, a molecular sieve having a molecular pore diameter of 0.4 nm will provide for the adsorption of the various inert gases listed above, but is less than the pore diameter at which chlorine will be absorbed. While any of the various zeolite materials having a pore diameter meeting the above criteria may be used, the preferred molecular sieve material is the commercially available 4 angstrom Linde molecular sieves. It is also possible to use a mixture of 3,4 and 5 angstrom molecular sieves.

Referring now to FIG. 1, in normal operation, valve 10 at the storage tank 4 and valves 16, 20, 23 and 30 and 32 are open while valves 7, 64, 42, 78, 44, 74, 46 and 82 are closed. If the purified chlorine is desired to be used on site and fed to a scrubber and plant system, then valve 36 will be closed and valve 22 open. With this arrangement, liquid chlorine flows out from the cylindrical storage tank 6, through line 12, into the bottom of the molecular sieve column. The liquid chlorine, which is under pressure from the storage tank 4, passes upwardly in the column 18 through the foraminous disk 118 and cloth 120 and through the molecular sieve material 110.

As it passes through the molecular sieve material 110, the inert gases are absorbed by the molecular sieve material 110 while the purified liquid chlorine continues to pass through the column 18 and out through the upper retainer assembly 112. As it exits the molecular sieve column 18, the purified liquid chlorine passes through line 24 to the heat exchanger 26 where it is vaporized for plant use. Upon exiting from the heat exchanger, the chlorine passes through line 28 and exits out to the plant system. The flow rate of the chlorine through the molecular sieve column 18 may be adjusted by valve 16. Flow meter 14 provides a means for reading the flow rate. Ideally, it has been found that the flow rate of from about 0.1 to about 4 liter/minute and preferably from about 0.2 to about 0.5 liter per minute may be used with a 3 inch diameter column.

If it is desired to load the purified liquid chlorine into a railway tank car or tanker truck, valve 22 in line 24 may be closed and valve 36 in line 34 opened. With this arrangement, the purified chlorine passes out of the molecular sieve column 18 and goes directly to line 34 to be loaded into a tank car.

The system also includes a means for bleeding off a portion of the treated chlorine for sampling. In order for the liquid chlorine to be sampled to test for the presence of the inert gases, it must be vaporized and directed to a gas chromograph. With the system shown in FIG. 1, and assuming that the treated liquid chlorine is being directed from the molecular sieve column 18 through line 24, when it is desired to sample, valves 46, 44 and 42 are opened. Valve 23 may be slowly closed so that flow is partially diverted to the vaporizer 50 through line 40. The chlorine from the vaporizer is then passed through line 52 to the gas chromograph 54 for testing.

When it is determined that enough sample has been taken, valve 46 is closed and valve 25 is opened fully to let the liquid chlorine drain back down to the heat exchanger 26. Valves 42 and 44 may then be closed whereupon the system may run in a normal manner.

One method of regenerating the molecular sieve in accordance with this invention is by heating the molecular sieve material and then evacuating the molecular sieve column by applying a vacuum thereto. This may be accomplished by closing valves 10, 16, 24 and 72 and opening valve 82. The heat exchanger 99 is activated to raise the temperature of the molecular sieve material to a temperature of between about 90° and about 200° C. and preferably between about 100° to about 150° C.

When the temperature of the molecular sieve material 110 reaches the desired temperature, the system may be vacuum-evacuated by applying a vacuum to the column 18 by actuation of the vacuum pump 84. Vacuum evacuation should take place for a suitable period of time, which may range from about 30 minutes to about 4 hours depending upon the size of the column.

Gas may then be used to purge the system to flush out the impurities. This may be accomplished by passing chlorine gas through the column 18 while the molecular sieve material is maintained at the elevated temperature. With the system shown in FIG. 1, valves 10, 16, 22, 23, 30, 36, 44, 46, 78 and 82 are closed and valve 22 is open.

Valve 72 should then be opened, followed by the opening of valve 42. The valve (not shown) on the flow meter should be opened so that indication of flow may be obtained as well as valve 64 in line 60 to the flow meter.

At this point, valve 58 at the chlorine storage tank 4 is opened to permit flow of chlorine gas through line 56. With this arrangement, the chlorine gas flows from line 56 through line 24 to the heat exchanger 26 where it is heated to a temperature of from about 90° to about 145° C. if desired and preferably about 100° C. if desired. However, in most cases, the heating of the chlorine gas should not be necessary due to the elevated temperature of the molecular sieve material. From the heat exchanger, the chlorine gas flows through line 28 through line 60 and flow meter 62 and the line 40 and 24 and then into the top of the molecular sieve cylinder 18. The chlorine gas exits the cylinder through line 12 and then branches off through lines 70 and 28 where it exits to the plant system. A vacuum, preferably about 28–29 in. Hg, may be applied to the system through line 28 by the plant system and/or the use of an auxiliary vacuum pump (not shown). Valve 58 may be used to adjust the flow to about 1 liter per minute.

The use of the gas as a regenerating material serves to flush out the molecules of the inert gas contained within the pores of the molecular sieve material so that the regeneration thereof is enhanced.

The chlorine gas purge may then be followed by a second vacuum evacuation while maintaining the molecular sieve at its elevated temperature. The length of time of this evacuation may be about 30 minutes to about 4 hours depending upon the size of the column. This may be accomplished according to the system as shown in FIG. 1 by closing valve 58 to shut down the chlorine gas flow. Valves 10, 16, 20 and 72 should all be closed and valve 82 opened. The evacuation may then proceed by the application of a vacuum to the column 18 by the vacuum pump 84 as discussed above.

Before startup, or if the system has to be shut down for a period of time, the system may be "blowndown" or purged with nitrogen gas. Also, this nitrogen gas purge may be used in place of the chlorine purge in the regeneration process discussed above. Valves 10, 58, 78, 46 and 36 are closed to shut down the system and valves 16, 23 and 30 and 32 should be opened as well as valve 22. The main valve (not shown) on the nitrogen cylinder 74 should be opened while the supply valve on the cylinder 74 remains closed. When ready to begin blowdown, the supply valve on the tank 70 and valve 78 in the system are open. Nitrogen is then vented into the system for a predetermined period time, which may be from about 3 to about 7 minutes and preferably for about 5 minutes.

During this particular time interval, nitrogen flows through line 76 to line 12 and through the molecular sieve column 18. The nitrogen continues through line 24 to the heat exchanger 26 and then from the heat exchanger 26 through line 28 where it exits to the plant system.

After a predetermined period of time, preferably about 5 minutes, valves 64 and 44 are opened which purges line 60 and the line 40 running from line 60 to the vaporizer. This may continue for about 5 minutes whereupon valve 72 may be opened and valve 23 closed. This will purge line 70 out through its connection into line 28 out to the plant system. This final purging may continue for an additional 5 minutes to rid the system of any residual chlorine. After the system has been purged of its residual chlorine, the nitrogen flow may be turned off at the tank and all valves closed for shut down, or the appropriate valve opened for startup.

By way of example, using the system described above, liquid chlorine at a pressure of between about 90 to 100 psi and 18° C. to 22° C. was fed to the molecular sieve column 18 containing 6.08 lbs of Linde 4 Angstrom zeolite molecular sieve material. The column had a 3″ diameter and was filled with the molecular sieve material to a height of 1 meter. The liquid chlorine entering the column contained about 1142 parts per million $CO_2$. The following Table 2 sets forth the amount of $CO_2$ present in the chlorine exiting from the column as the amount of chlorine treated increased.

From Table 2 it is seen that over 59.6 liters of chlorine was treated before 200 ppm $CO_2$ began to appear in solution in the exiting chlorine. Thus, if this were the maximum amount of $CO_2$ that could be tolerated, then the molecular sieve would have to be regenerated at this point.

TABLE 2

| Net Chlorine Fed to Column (Liters) | Time Increment (Hours) | Carbon Dioxide (ppm) |
|---|---|---|
| 3.8 | 0.000 | — |
| 4.1 | 0.017 | — |
| 4.8 | 0.050 | — |
| 5.9 | 0.100 | — |
| 7.6 | 0.183 | — |
| 7.9 | 0.200 | — |
| 10.1 | 0.283 | — |
| 10.8 | 0.317 | — |
| 13.8 | 0.567 | 4.60 |
| 16.9 | 0.683 | 6.92 |
| 20.0 | 0.850 | 9.24 |
| 24.8 | 1.133 | 5.88 |
| 31.2 | 1.417 | 15.59 |
| 35.3 | 1.700 | 27.86 |
| 40.0 | 1.967 | 29.05 |
| 44.1 | 2.233 | 54.19 |
| 49.7 | 2.513 | 68.06 |
| 55.1 | 2.800 | 119.60 |
| 59.6 | 3.083 | 193.20 |
| 64.1 | 3.350 | 217.20 |
| 68.4 | 3.630 | 325.40 |
| 73.8 | 3.917 | 369.90 |
| 79.1 | 4.200 | 469.40 |
| 83.4 | 4.467 | 569.70 |
| 87.0 | 4.730 | 593.40 |
| 90.0 | 5.017 | 679.30 |
| 93.9 | 5.233 | 750.40 |
| 98.2 | 5.517 | 836.00 |
| 101.4 | 5.783 | 934.00 |
| 105.4 | 6.070 | 1031.30 |

As a second example, about 6 lbs of Linde 4 Angstrom Molecular Sieve was treated by heating to 100° C. in a vacuum oven with a helium back-fill and evacuated to 28 in. Hg. Liquid chlorine was fed to the treated sieve in a 3 inch diameter column with the run starting at 100 psi at 23° C. and ending at 90 psi at 20° C. The chlorine fed to the column contained about 1142 ppm $CO_2$. The amount of $CO_2$ present in the chlorine after it exited from the column is set forth in TABLE 3 for increasing levels of chlorine fed to the column expressed in liters per pound of molecular sieve.

As may be seen from TABLE 3, over 9.8 liters of chlorine per pound of molecular sieve was able to be treated until 200 ppm $CO_2$ began to appear in solution in the exiting chlorine. Thus, if 200 ppm were the maximum amount of $CO_2$ that can be tolerated, it is at this point the molecular sieve should be regenerated.

TABLE 3

| Chlorine (Liters/lbs. mol. sieve) | Carbon Dioxide (ppm) |
|---|---|
| 0 | — |
| 0.625 | — |
| 0.674 | — |
| 0.789 | — |
| 0.970 | — |
| 1.250 | — |
| 1.299 | — |
| 1.660 | — |
| 1.776 | — |
| 2.269 | 4.60 |
| 2.779 | 6.92 |
| 3.289 | 9.24 |
| 4.080 | 5.88 |
| 5.132 | 15.59 |
| 5.800 | 27.86 |
| 6.578 | 29.05 |
| 7.252 | 54.19 |
| 8.173 | 68.06 |
| 9.060 | 119.60 |
| 9.800 | 193.20 |
| 10.540 | 217.20 |
| 11.250 | 325.40 |
| 12.128 | 369.90 |
| 13.000 | 469.40 |
| 13.175 | 569.70 |
| 14.307 | 593.40 |
| 14.800 | 679.30 |
| 15.440 | 750.40 |
| 16.150 | 836.00 |
| 16.675 | 934.00 |
| 17.333 | 1031.30 |

After the run of the second Example described above, the molecular sieve was heated to 100° C. in a 28 in. Hg vacuum for 4 hours and then purged with 0.1 liter per minute of nitrogen for 1 hour at 100° C. This was followed by 2 hours of vacuum evacuation at 100° C.

Liquid chlorine initially containing 1017 ppm $CO_2$ was fed to the column starting at 84 psi and 19° C. and ending at 78 psi and 17° C. The results of this run are set forth below in TABLE 4.

As shown in TABLE 4, in this run over 14.333 liters of chlorine per pound of molecular sieve was treated before 200 ppm $CO_2$ began to appear in solution in the exiting chlorine. In this case, if 200 ppm were the upper limit of $CO_2$ that could be tolerated, the molecular sieve would not have to be regenerated until this amount of chlorine was treated.

TABLE 4

| Chlorine (Liters/lbs. mol. sieve) | Carbon Dioxide ppm |
|---|---|
| 0.000 | — |
| 1.735 | 4.61 |
| 2.700 | 0.85 |
| 3.600 | 8.75 |
| 4.517 | 3.07 |
| 5.367 | 4.38 |
| 6.200 | 0.51 |
| 7.000 | 2.32 |
| 7.700 | 7.51 |
| 8.467 | 20.99 |
| 9.367 | 18.61 |
| 10.150 | 41.27 |
| 10.950 | 59.02 |
| 11.760 | 95.27 |
| 12.683 | 113.40 |
| 13.600 | 144.80 |
| 14.333 | 148.90 |
| 15.400 | 216.50 |
| 16.283 | 235.90 |
| 17.167 | 273.80 |
| 17.983 | 367.20 |

TABLE 4-continued

| Chlorine (Liters/lbs. mol. sieve) | Carbon Dioxide ppm |
| --- | --- |
| 18.950 | 398.10 |
| 19.750 | 553.10 |
| 20.517 | 638.10 |
| 21.250 | 671.60 |
| 22.033 | 572.00 |
| 22.867 | 781.60 |
| 23.733 | 846.10 |
| 24.517 | 880.20 |
| 25.267 | 868.60 |
| 26.017 | 884.90 |
| 26.750 | 932.20 |
| 27.483 | 939.00 |
| 28.233 | 964.90 |
| 28.933 | 998.10 |

It has been found that, depending upon the level of $CO_2$ present in the liquid chlorine and the length of time that the molecular sieve is in use, the $CO_2$ molecules will tend to displace the other inert gas molecules that have been adsorbed by the molecular sieve. This will result in these other inert gases being present in the treated chlorine. Accordingly, in such cases it may be desirable to use two molecular sieve columns in series. The first to remove the $CO_2$ and the second, to remove the other inert gases.

It is apparent that there has been provided in accordance with this invention a process for removal of inert gases from liquid chlorine and a system therefor which satisfies the objects, means and advantages set forth hereinabove. While the invention has been described in combination with the embodiment thereof, it is evident that many alternatives, modifications and variations will be apparent to those skilled in the art in light of the foregoing description. Accordingly, it is intended to embrace all such alternatives, modifications and variations as fall within the broad scope of the appended claims.

We claim:

1. A process for treating liquid chlorine to remove inert gases therefrom comprising:
   providing a column containing a molecular sieve which has a molecular pore diameter greater than the molecular diameter of the inert gases to be removed, and smaller than the molecular diameter of the liquid chlorine, and;
   passing the liquid chlorine through the sieve whereby at least some of the inert gases is adsorbed by the molecular sieve while the liquid chlorine passes therethrough.

2. The method of claim 1 wherein said molecular sieve is periodically regenerated by heating the molecular sieve and vacuum evacuating the column in which the sieve is contained and purging the molecular sieve with a gas to flush out impurities.

3. The method of claim 1 wherein said molecular sieve is periodically regenerated by heating the molecular sieve and vacuum-evacuating the container in which the sieve is contained and thereafter passing gaseous chlorine at an elevated temperature through the molecular sieve, and then again vacuum-evacuating the container.

4. The method of claim 3 wherein the gaseous chlorine for regeneration is at temperature of from about 90° to about 100° C.

5. A system for treating liquid chlorine to remove inert gases therefrom comprising:
   a column containing a molecular sieve,
   said molecular sieve having a molecular pore diameter greater than the molecular diameter of the inert gases to be removed and smaller than the molecular diameter of the liquid chlorine;
   a source of liquid chlorine under pressure; and means for passing said chlorine from said source to said column to permit said chlorine to pass through the molecular sieve to remove at least a portion of the inert gases.

6. The system of claim 5 further including means for controlling the rate of flow of said chlorine through said system.

7. The system of claim 6 further including a flow meter for determining the flow of chlorine to said molecular sieve column.

8. The system of claim 5 further including means for regenerating said molecular sieve.

9. The system of claim 8 wherein said means for regenerating includes a vacuum pump attached to one end of the column for applying a vacuum to said column, and heating means for heating the molecular sieve, and means for purging the system with a gas to flush out impurities.

10. The system of claim 9 wherein said means for regenerating further includes a source of gaseous chlorine, and means for passing said gaseous chlorine through said molecular sieve column after said molecular sieve column has been vacuum-evacuated.

11. The system of claim 10 wherein said system includes a means for heating said gaseous chlorine to an elevated temperature.

12. The system of claim 5 further including means for purging said system with nitrogen, said purging means including a source of nitrogen, means for shutting off the flow of chlorine into said system, and means for feeding nitrogen to said system and therefrom.

13. The system of claim 5 further including means for bleeding a portion of said liquid chlorine after it has been purified for the purpose of taking a sample.

14. The system of claim 5 wherein said column includes an intermediate section and upper and lower sections attached thereto at opposite ends thereof, and means for retaining said molecular sieve within said intermediate portion.

15. The system of claim 14 wherein said means for retaining said molecular sieve includes a foraminous disk member having a pliable cloth extending thereover on the side of said disk facing the interior of the intermediate portion.

16. The system of claim 14 wherein said upper and lower sections have a flange at one end thereof and said intermediate section has a flange at each end thereon connected to a respective flange on said upper and lower section, a recess in each end of said intermediate section, and said means for retaining said molecular sieve being positioned in each of said recesses.

* * * * *